Oct. 19, 1965       E. H. AYERS       3,212,707
TORQUE CONVERTER SPEED CHANGE AND EFFICIENCY INDICATOR MEANS
Filed May 9, 1960                    4 Sheets-Sheet 1

INVENTOR.
EDGAR H. AYERS
BY
Brown, Jackson, Boettcher & Diemer,
ATTORNEYS.

Oct. 19, 1965 E. H. AYERS 3,212,707
TORQUE CONVERTER SPEED CHANGE AND EFFICIENCY INDICATOR MEANS
Filed May 9, 1960 4 Sheets-Sheet 2

INVENTOR.
EDGAR H. AYERS
BY
ATTORNEYS.

*INVENTOR.*
EDGAR H. AYERS

ATTORNEYS.

United States Patent Office 3,212,707
Patented Oct. 19, 1965

3,212,707
TORQUE CONVERTER SPEED CHANGE AND
EFFICIENCY INDICATOR MEANS
Edgar H. Ayers, Battle Creek, Mich., assignor to Clark
Equipment Company, a corporation of Michigan
Filed May 9, 1960, Ser. No. 27,728
1 Claim. (Cl. 235—103.5)

This invention relates to automotive vehicle drive means, and has to do with drive means comprising a fluid torque converter and associated means for assuring operation thereof at maximum efficiency.

It is known, in heavy duty automotive vehicles, with which my invention is particularly concerned, to control the motor by a governor so that it will operate at its most efficient speed. The operator can lower the speed of the motor by letting up on the throttle, but he can not operate it at a speed in excess of that permitted by the governor. During normal operation, the motor works against the governor at a controlled speed such that it operates at maximum efficiency. In a power train comprising a fluid torque converter, the latter may operate at comparatively low efficiency resulting in inefficient operation of the power train as a whole, even though the engine or motor is operated at maximum efficiency.

My invention is directed to means whereby a fluid torque converter included in an automotive vehicle power train may be operated at optimum efficiency thereby assuring maximum efficiency of the power train as a whole. More particularly, I provide tachometer means effective for indicating the ratio of the speeds of the input and output shafts of the converter and the required adjustment of multi-ratio transmission means, driven by the output shaft, to assure the optimum ratio between such speeds if the indicated ratio differs from the desired optimum. In its broader aspects my invention comprehends novel tachometer means particularly suited to the purpose stated though, in certain respects, suitable for other purposes. Further objects and advantages of my invention will appear from the detail description.

Figure 1:
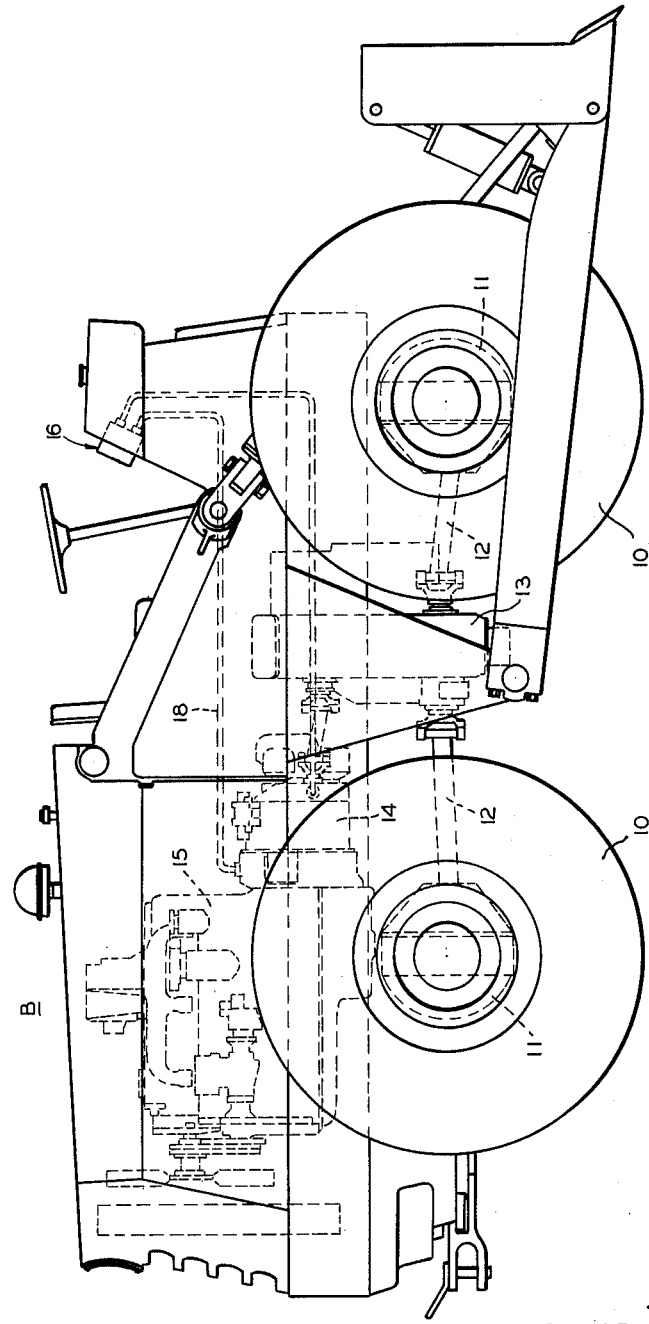
FIGURE 1 is a side view of an automotive vehicle having a power train comprising a fluid torque converter and provided with efficiency and ratio indicator means embodying my invention.

I have shown the efficiency and ratio indicating means of my invention as applied, by way of example, to an automotive vehicle in the form of a bulldozer B having ground engaging members in the form of front and rear wheels 10 appropriately mounted on axles respectively including a differential 11. The axles are driven, through differentials 11, by propeller shafts 12 driven by a multi-speed ratio transmission 13.

The transmission 13 is driven from the output shaft of a fluid torque converter 14 of known type. The input shaft of the converter 14 is driven by an internal combustion engine or motor 15 of conventional type. The motor 15 preferably is provided with a governor, as is known and has been indicated above, and together with the torque converter 14 and transmission 13 consitutes the power train of the vehicle or bulldozer B. The transmission 13 is of known or conventional type. It is power shifted and changed from one ratio to another by a small shift lever which, through suitable valving, causes fluid operated multiple disc clutches in the transmission to be engaged and disengaged, as required, effective for changing the torque multiplication ratio of the transmission 13. When the latter is shifted down, to provide a larger or increased torque multiplying ratio, the converter 14 is automatically shifted up, because it then provides less of the total torque multiplication required to drive the wheels 10, and the speed of rotation of the output shaft of converter 14 is correspondingly increased. When the transmission 13 is shifted up, with decreased torque multiplying ratio, the opposite effect is produced and the speed of rotation of the output shaft of converter 14 is correspondingly decreased.

A converter such as the fluid torque converter 14 operates most efficiently when the ratio between the speeds of rotation of its input and output shafts is somewhat less than unity. It is desirable that the converter be at or near its point of maximum efficiency, to minimize fuel consumption and reduce heat losses. The advantages in reducing fuel consumption are obvious. Not many automotive vehicles have sufficient built-in cooling capacity to dissipate the heat produced by operation of the converter in a low efficiency range for extended periods of time. By assuring operation of the converter in a high efficiency range overheating and resultant inefficient operation and heat losses are avoided.

Figure 2:
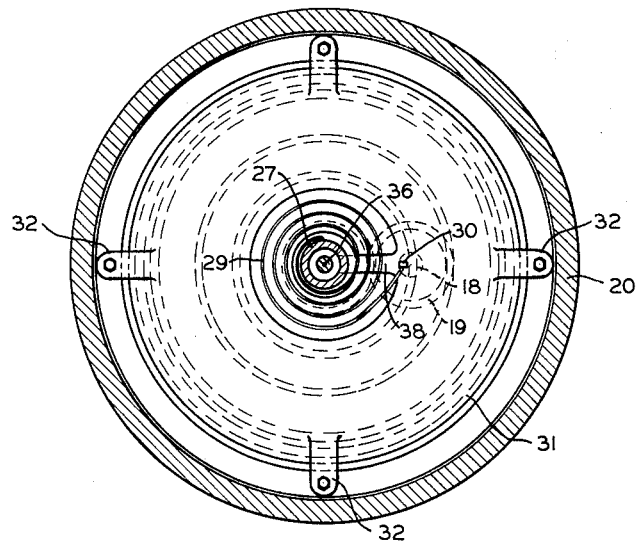
FIGURE 2 is a horizontal sectional view, taken substantially on line 2—2 of FIGURE 3, of the speed ratio and shift indicating instrument of my invention.
Figure 3:
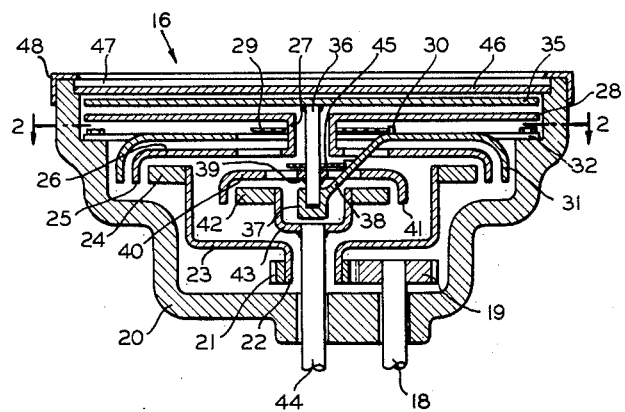
FIGURE 3 is a central vertical sectional view of the instrument of FIGURE 2, certain parts being shown in elevation.
Figure 5:
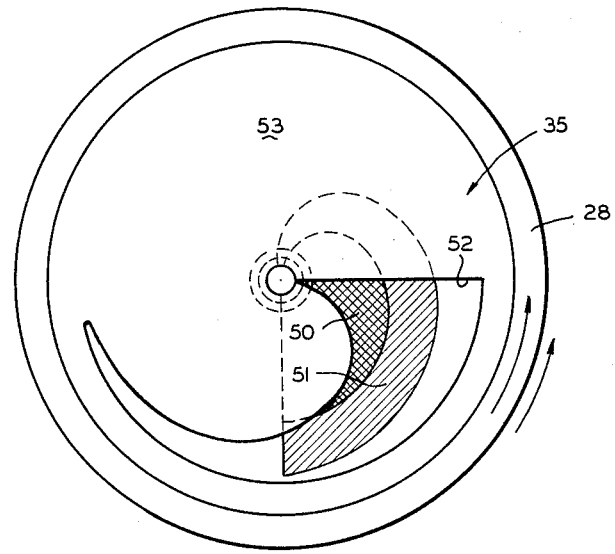
FIGURE 5 is a face view of the dial driven from the output shaft of the fluid torque converter, shown in its normal position overlying the dial driven from the input shaft of the converter.

In order to assure operation of the converter 14 in a high efficiency range, I provide means for indicating the ratio between the speeds of rotation of the input and the output shafts of converter 14, such means also indicating when a shift of the transmission 13 is required to maintain the desired range and the nature of the required shift. To that end I provide an instrument 16, in the general nature of a tachometer, which may be mounted on the instrument panel of the vehicle B. The instrument 16 is provided with a housing 20 similar to that of speedometers of known type. Referring to FIGURES 2 and 3, the input shaft of the converter 14 has driving connection, by means of a flexible cable 18, to a spur gear 19 within housing 20 of instrument 16. Gear 19 meshes with a spur pinion 21 fixed on the lower end of neck 22 of a cup 23 rotatably mounted within housing 20. A magnet 24, fixed to cup 23, extends therefrom into close promimity to a concentric flange 25 of a disc 26 formed of aluminum or any suitable material. Disc 26 has an upwardly extending tubular neck 27 on the upper end of which is secured a disc or dial 28. A spirally coiled hair spring 29 extends about neck 27 and is secured at one end thereto, the other end of spring 29 being anchored, at 30, to an anchor plate 31 having tabs 32 extending radially outward therefrom and fixed to housing 20. The cup 23 is rotated counter-clockwise, as viewed from above and the disc 26 is turned counter-clockwise by the rotating magnet 24, to an extent corresponding to the speed of rotation of the input shaft of the fluid torque converter 14. The dial 28 turns with disc 26 and may be referred to as the input dial.

A dial 35, which may be referred to as the output dial, is fixed on the upper end of a stub shaft 36 extending through neck 27 concentrically therewith and rotatably mounted at its lower end in a bearing cut 37 at the lower end of an arm 38 extending downward from anchor plate 31. Stub shaft 36 extends through, and is welded to, the inner end of an arm 39 of a disc 40 formed of aluminum or any suitable material. Disc 40 is provided with a downwardly extending flange 41 disposed concentrically with and in close proximity to a magnet 42 secured to and extending about the top of a cup 43 driven from the output shaft of torque converter 14 by means of a flexible shaft 44. A spirally coiled hair spring 45 extends about stub shaft 36 with one end secured thereto and its other end anchored to plate 31. The dial 35 is driven in counter-clockwise direction, as viewed from above, in the same manner as dial 28, as will be understood from what has been said. A masking disc 46, preferably formed of opaque material, overlies dial 35 and underlies a cover 47 of glass or any suitable transparent material. The disc 46 and cover 47 may be confined between an inner shoulder of housing 20 and a flanged retaining ring 48 secured about the top of housing 20. As will be understood from the above, the instrument 16 is, in general, analogous to a double speedometer in which the dials 28 and 35 are driven from the input and output shafts, respectively, of the fluid torque converter 14.

Figure 4:
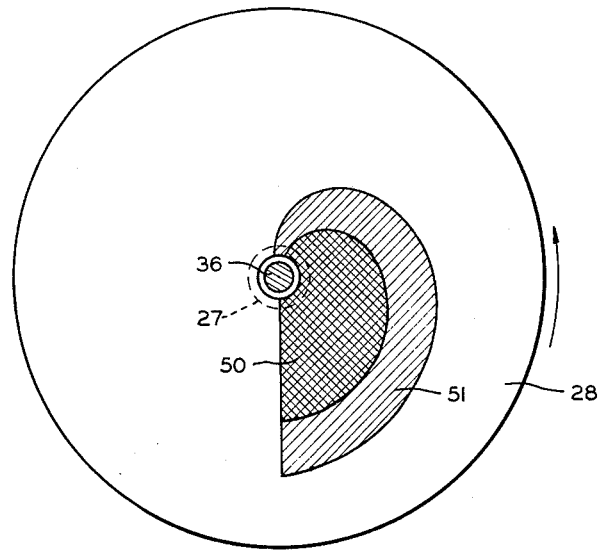
FIGURE 4 is a face view of the dial driven from the input shaft of the fluid torque converter.
Figure 7:
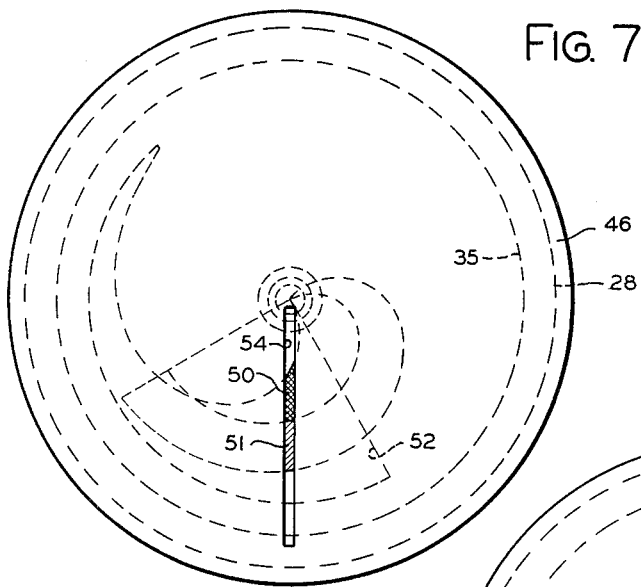
FIGURES 6, 7 and 8 are views similar to FIGURE 5 but showing the dials of FIGURES 4 and 5 in different relative angular positions and underlying a cover or masking disc.
Figure 6:
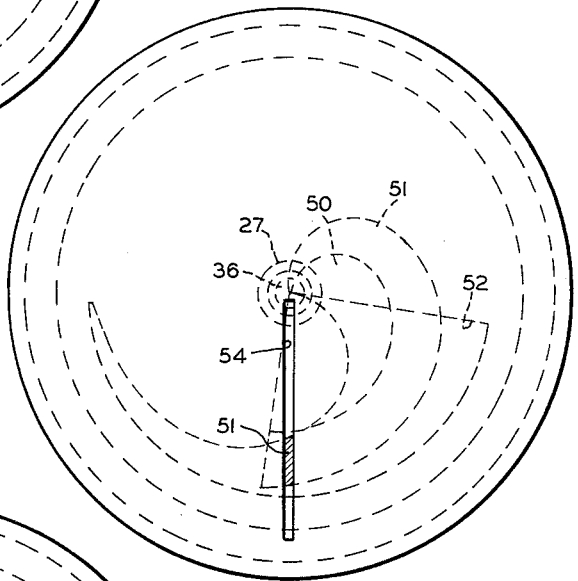

In FIGURES 5 to 8, inclusive, the dials 28 and 35 are shown as being of different diameters, for clearness of illustration. The dial 28 is fixed to neck 27 and turns therewith in counter-clockwise direction, as indicated by the arrow in FIGURE 4, and to extent corresponding to the speed of rotation of the input shaft of converter 14. The dial 28 is provided with an inner red area 50 and an outer green area 51 partially enclosing red area 50. The red area 50 is established as a function of the logarithm of the speed of rotation (r.p.m.) of the input shaft of the converter 14, multiplied by .425, and the green area 51 is established as a function of the logarithm of the speed of rotation (r.p.m.) of the input shaft of the converter 14 multiplied by .825; as will be explained more fully presently. The upper dial 35, shown as of less diameter than dial 28, is secured on the stub shaft 36 in overlying relation to dial 28. The dial 35 is provided with an opening 52 and a blocking area 53 which is established as a function of the logarithm of the speed of rotation (r.p.m.) of the output shaft of converter 14. Dial 35 is also turned in counter-clockwise direction, as indicated by the arrow in FIGURE 5.

The variations in output to input ratios which would occur with input variations between 1800 and 2000 r.p.m. if shifts were made at 806 and 1568 r.p.m. output are indicated below, as follows—

| Input, r.p.m. | Output, r.p.m. | Ratio Output to Input, r.p.m. |
| --- | --- | --- |
| 1,800 | 806 | .448 |
| 1,800 | 1,568 | .87 |
| 1,900 | 806 | .425 |
| 1,900 | 1,568 | .825 |
| 2,000 | 806 | .403 |
| 2,000 | 1,568 | .784 |

It will be seen that when the speed of rotation of the output shaft of converter 14 is 1568 r.p.m. and the speed of rotation of the input shaft is from 1800 to 1900 r.p.m., the ratio of the speed of the output shaft to the speed of the input shaft is from .825 to .870, which approaches unity and is within the range assuring optimum performance of the converter 14. When the speed of rotation of the output shaft is substantially less than 1568 r.p.m. the ratio of the speed thereof to the speed of rotation of the input shaft falls below .825, and when the speed of rotation of the output shaft drops to approximately 800 r.p.m., with the speed of rotation of the input shaft at from 1800 to 2000 r.p.m., the ratio of the speed of rotation of the output shaft to that of the input shaft drops to from about .400 to .450, far below unity. In order to assure optimum performance of the converter 14, the ratio of the speed of the output shaft to that of the input shaft should be kept within the range of from .825 to .870.

Figure 8:
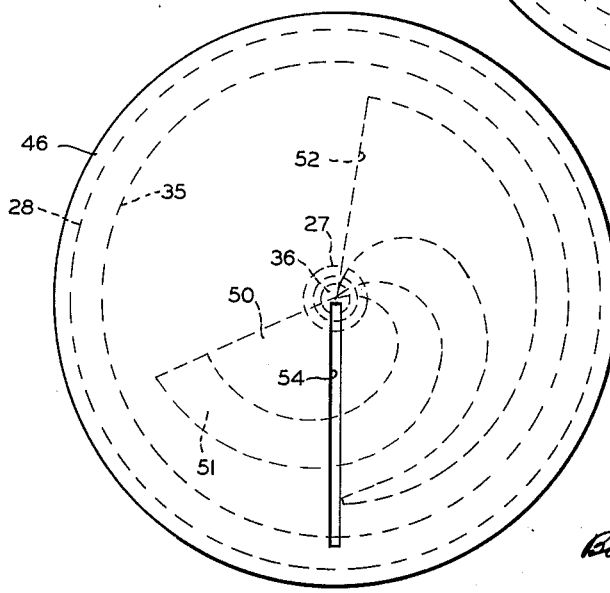

The masking disc 46, preferably opaque, is secured in the housing 20 of instrument 16 and overlies the dial 35, which may be referred to as the output shaft dial, dial 28 being the input shaft dial. The disc 46 is provided in its lower portion with a radial viewing slot 54. The dials 28 and 35 and disc 46 are so related that when the ratio of the speed of rotation of the converter output shaft to that of the input shaft is within the desired range of from .825 to .870 a narrow strip of the green area 51 of the input shaft dial 28 is visible through the viewing slot 54 (FIGURE 6); when the ratio falls below the desired range the red and the green areas 50 and 51 of the input shaft dial 28 are visible through slot 54 (FIGURE 7); and when the ratio exceeds the desired maximum of .870 neither the green nor the red of dial 28 is visible through slot 54 of the masking disc 46 (FIGURE 8).

The masking disc 46 is provided, at the right hand side of slot 54 with the legend "shift up when green disappears" and, at the left side of slot 54, with the legend "shift down when red shows." The legend, in each instance, refers to the transmission 13. When neither red nor green is visible through slot 54 it indicates that the speed of rotation of the output shaft of converter 14 is too high relative to that of the input shaft. The operator remedies that condition by shifting up or reducing the torque multiplication ratio of the transmission 13 thereby decreasing the speed of rotation of the output shaft of the converter 14. Such shifting up of the transmission continues until the green is again visible through slot 54 indicating reestablishment of a ratio, within the desired range, between the speeds of rotation of the output and input shafts of the converter 14. When the red becomes visible through slot 54 it indicates that the speed of rotation of the converter output shaft is too low, relative to that of the input shaft, to give a ratio within the desired range. That condition is remedied by shifting down the transmission 13 until the red is no longer visible through the slot 54, with the green only remaining visible. That restores the ratio between the speeds of rotation of the input and output shafts of converter 14, to a value within the desired range, as indicated by the green, as above noted.

The instrument 16 is analogous to a tachometer comprising two members 27 and 36 driven from the input and output shafts, respectively, of the fluid torque converter 14 and means actuated by such members for indicating the ratio between the speeds of rotation of the shafts. Further, the efficiency and ratio indicator means of my invention includes means for adjusting the speed of rotation of the converter output shaft and for indicating the required adjustment thereof, to maintain the speed ratio of the two shafts within the desired range to assure optimum performance of the converter.

The dials and masking disc of the instrument may be formed of any suitable material, and the dials may be provided with suitably graduated scales to indicate the speed of rotation of the corresponding shafts. If desired, the red and green areas 50 and 51 of the input shaft dial 28 may be formed of any suitable translucent material and illuminated from beneath, as is frequently done in various instruments. With the broader concept of my invention, any suitable means may be provided for indicating the ratio between the speeds of rotation of the input and output shafts of the torque converter, such means being driven from such shafts in any suitable manner.

It will be understood that changes in detail may be resorted to without departing from the field and scope of my invention, and I intend to include all such variations, as fall within the scope of the appended claim, in this application in which the preferred form only of my invention has been disclosed.

I claim:

In efficiency and ratio indicator means for an automotive vehicle having ground engaging drive members, a motor, a fluid torque converter having an input shaft driven by said motor and an output shaft, a multi-ratio adjustable transmission driven by said output shaft and having driving connection to said drive members, a first rotatably mounted tachometer member, a second tachometer member mounted for rotation independently of said first member, a positive mechanical driving connection between one of said shafts and said first tachometer member, a positive mechanical driving connection between the other of said shafts and said second tachometer member, a first rotatable dial driven by said first tachometer member and having marked areas on its upper face indicative of the extent of turning thereof, a second rotatable dial overlying said first dial driven independently thereof by said second tachometer member and having an opening for exposing said areas of said first dial, and a fixed masking disc overlying said second dial having a slot for viewing restricted portions of said areas of said first dial, said dials being effective in cooperation with said disc for indicating the ratio between the speeds of said shafts and the required adjustment of said transmission to bring the indicated ratio to a desired optimum ratio if it differs materially therefrom.

References Cited by the Examiner

UNITED STATES PATENTS

| | | | |
|---|---|---|---|
| 1,417,048 | 5/22 | Farmer | 235—103.5 |
| 1,486,619 | 3/24 | Tolson | 235—103.5 |
| 1,510,440 | 9/24 | Gilman | 324—70 |
| 2,276,739 | 3/42 | Rogers | 324—69 X |
| 2,387,901 | 10/45 | Haverstick | 324—69 X |
| 2,499,128 | 2/50 | Brunken | 74—336.5 X |
| 2,879,940 | 3/59 | Cornell | 116—57 |
| 2,915,703 | 12/59 | Kessler | 324—69 |
| 2,935,311 | 5/60 | Kabelitz | 317—6 |

WALTER L. CARLSON, *Primary Examiner.*

SAMUEL BERNSTEIN, FEDERICK M. STRADER, *Examiners.*